(12) United States Patent
Holmes

(10) Patent No.: US 9,038,581 B2
(45) Date of Patent: May 26, 2015

(54) LINEAR ALTERNATOR ASSEMBLY WITH FOUR-STROKE WORKING CYCLE AND VEHICLE HAVING SAME

(71) Applicant: GM GLOBAL TECHNOLOGY OPERATIONS LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 13/761,435

(22) Filed: Feb. 7, 2013

(65) Prior Publication Data

US 2014/0216411 A1    Aug. 7, 2014

(51) Int. Cl.
| | |
|---|---|
| F02B 63/04 | (2006.01) |
| F02B 41/00 | (2006.01) |
| F02B 71/04 | (2006.01) |
| F02D 39/10 | (2006.01) |
| F01N 5/02 | (2006.01) |
| F02B 37/00 | (2006.01) |

(52) U.S. Cl.
CPC .............. *F02B 71/04* (2013.01); *F02D 39/10* (2013.01); *F02B 63/041* (2013.01); *F01N 5/02* (2013.01); *F02B 37/00* (2013.01)

(58) Field of Classification Search
CPC ... B60K 6/26–6/28; B60K 6/42; B60K 6/448; H02K 7/1884; F02B 71/04; F02B 63/041; F02B 11/004; F02B 75/28; F02B 71/00; F02F 7/0009

USPC ..................... 123/46 E, 46 R, 51 A
See application file for complete search history.

(56) References Cited

U.S. PATENT DOCUMENTS

| | | | | |
|---|---|---|---|---|
| 3,673,797 | A * | 7/1972 | Wilkinson ................. | 60/600 |
| 7,082,909 | B2 * | 8/2006 | Graf et al. ................. | 123/46 E |
| 8,789,499 | B2 * | 7/2014 | Alonso ...................... | 123/51 R |
| 2005/0284426 | A1 * | 12/2005 | Tusinean .................. | 123/46 R |
| 2009/0179424 | A1 * | 7/2009 | Yaron ....................... | 290/52 |
| 2012/0112467 | A1 * | 5/2012 | Gopalakrishnan et al. ... | 290/1 A |
| 2012/0112468 | A1 * | 5/2012 | Najt et al. .................. | 290/1 A |

* cited by examiner

*Primary Examiner* — Lindsay Low
*Assistant Examiner* — Kevin Lathers
(74) *Attorney, Agent, or Firm* — Quinn Law Group, PLLC

(57) ABSTRACT

A linear alternator assembly is provided that includes a block defining a cylinder. The cylinder block has inlet ports at which fluid enters the cylinder, exhaust ports at which fluid is exhausted from the cylinder, and a fuel port. Energizable coils surround the cylinder. A first and a second magnetic or magnetizable piston are contained within the cylinder and are positionable within the cylinder in response to energization of selective ones of the coils and combustion of fuel within the cylinder to selectively establish a four-stroke working cycle having an intake stroke, a compression stroke, an expansion stroke, and an exhaust stroke, producing at least one of compressed gas and electrical energy. The four-stroke working cycle may be varied to adapt to changes in power demanded, thereby balancing required output power with efficiency considerations.

18 Claims, 5 Drawing Sheets

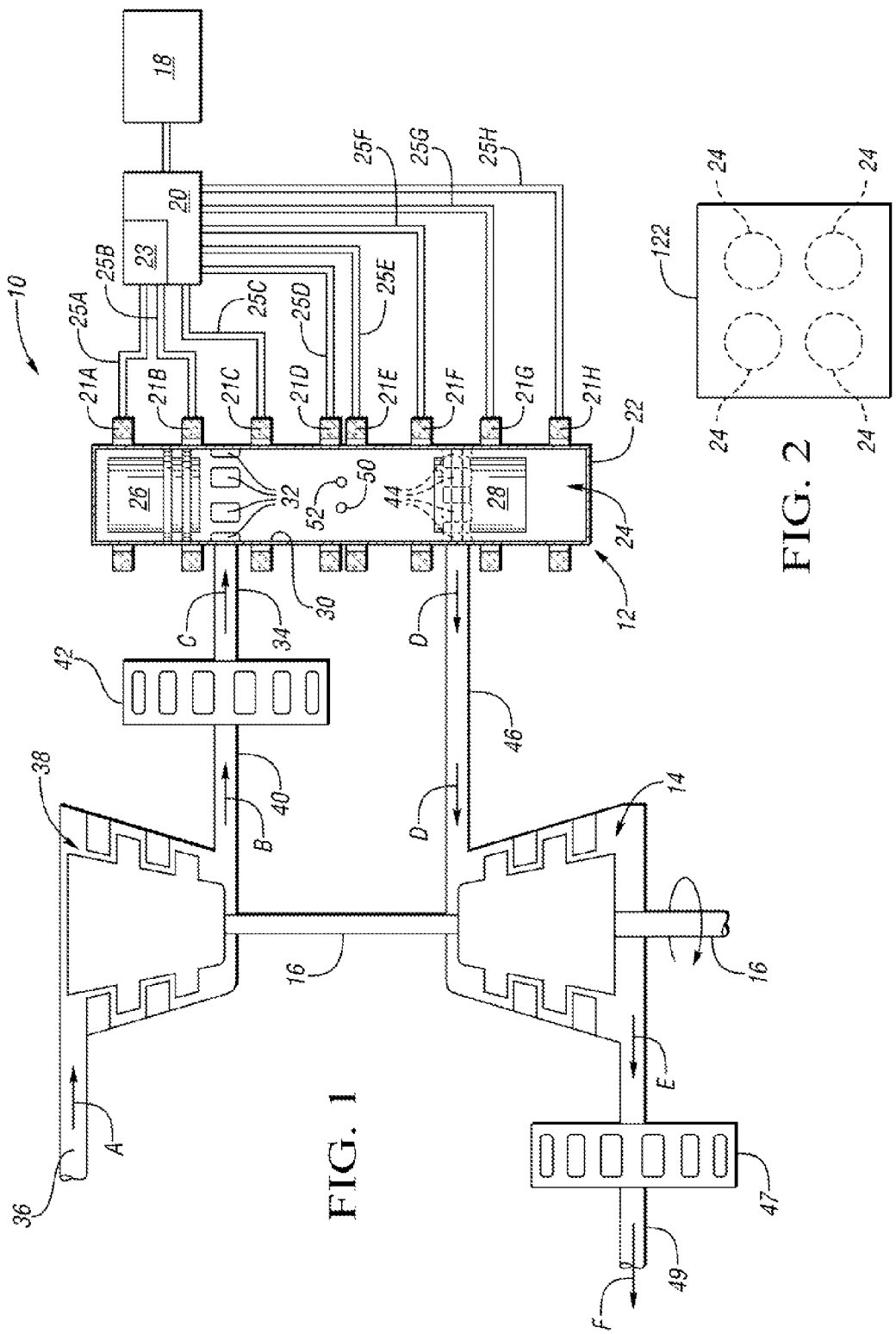

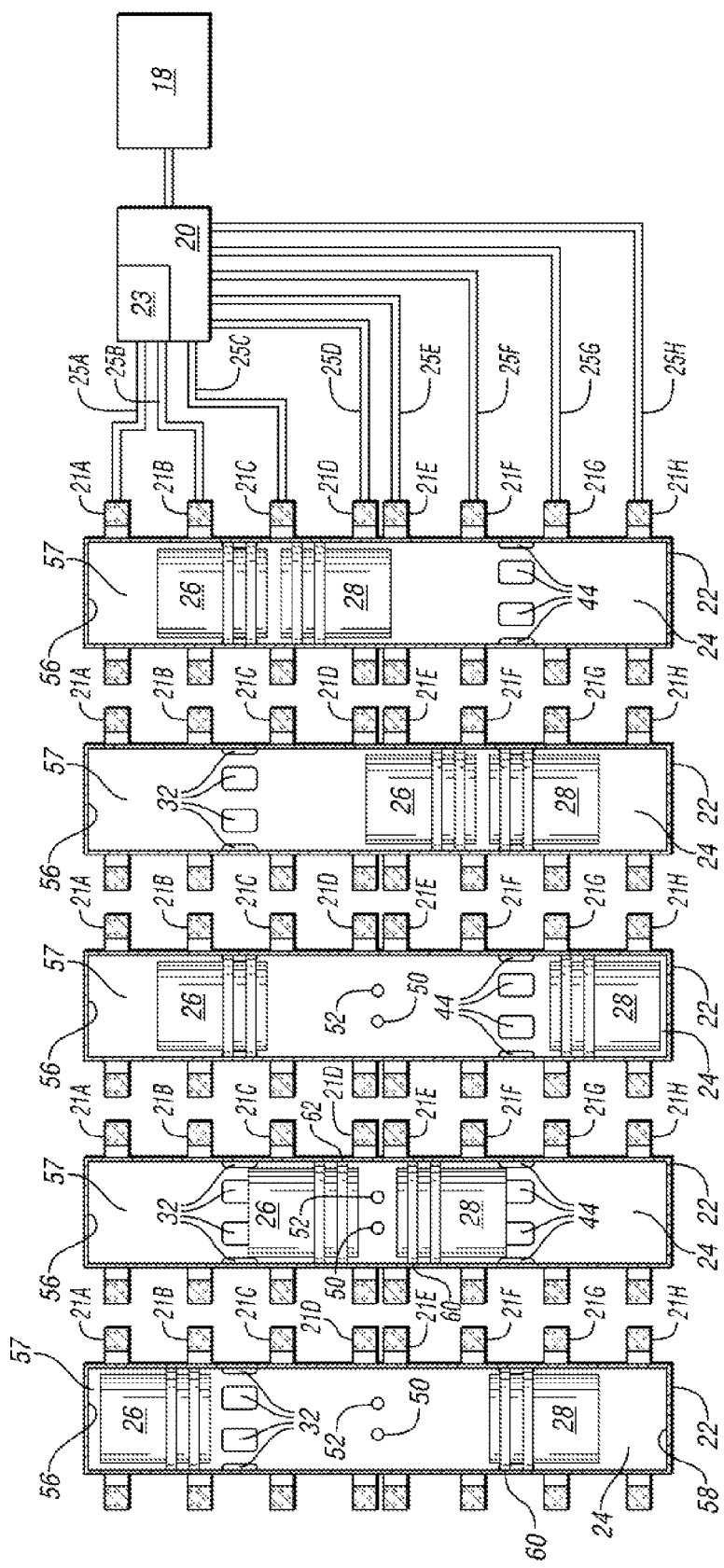

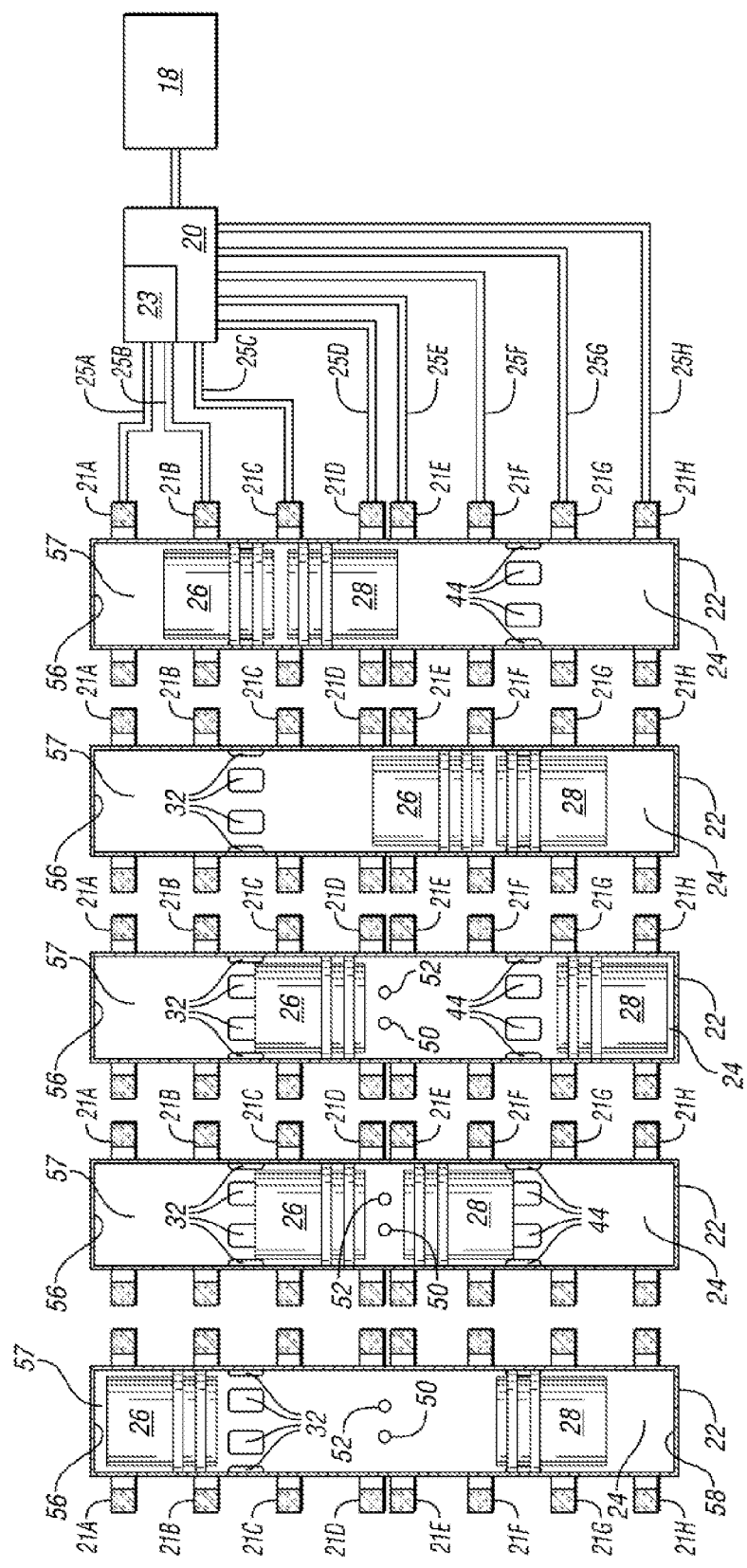

LINEAR ALTERNATOR ASSEMBLY WITH FOUR-STROKE WORKING CYCLE AND VEHICLE HAVING SAME

TECHNICAL FIELD

The present teachings generally include a ported linear alternator assembly.

BACKGROUND

Vehicle designers strive to power vehicles with highly fuel efficient engines or other power sources. Engines that achieve low fuel emissions, run on low cost fuels, and are of relatively low complexity are desirable.

SUMMARY

A linear alternator assembly is provided that includes a cylinder block defining a cylinder. The cylinder block has inlet ports at which fluid enters the cylinder, exhaust ports at which fluid is exhausted from the cylinder, and a fuel port through which fluid is selectively supplied to the cylinder for combustion. A plurality of energizable coils surrounds the cylinder. A first and a second piston are contained within the cylinder. The pistons are either magnetic or magnetizable. An electronic controller is operatively connected to the coils and is configured to selectively energize different ones of the coils to thereby move the first and the second pistons asymmetrically within the cylinder, energization of the coils and combustion of the fuel thereby establishing a four-stroke working cycle producing at least one of compressed gas and electrical energy. The four-stroke working cycle may be varied to adapt to changes in power demanded, thereby balancing required output power with efficiency considerations.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a schematic illustration in partial cross-sectional view of a powertrain with a ported linear alternator assembly powering a shaft and providing electrical energy.

FIG. 2 is a schematic illustration in plan view of a cylinder block configured to provide a ported linear alternator assembly with four working cylinders.

FIG. 3 is a schematic illustration in partial cross-sectional view of the ported linear alternator assembly of FIG. 1 with pistons positioned following an intake stroke of a first four-stroke working cycle.

FIG. 4 is a schematic illustration in partial cross-sectional view of the ported linear alternator assembly of FIG. 1 with pistons positioned following a compression stroke.

FIG. 5 is a schematic illustration in partial cross-sectional view of the ported linear alternator assembly of FIG. 1 with pistons positioned following an expansion stroke.

FIG. 6 is a schematic illustration in partial cross-sectional view of the ported linear alternator assembly of FIG. 1 with pistons positioned following an exhaust stroke.

FIG. 7 is a schematic illustration in partial cross-sectional view of the ported linear alternator assembly of FIG. 1 with pistons moved to a reset position.

FIG. 13 is a schematic illustration in partial cross-sectional view of the ported linear alternator assembly of FIG. 1 with pistons positioned following an intake stroke of a geometrically under-expanded alternate four-stroke working cycle.

FIG. 14 is a schematic illustration in partial cross-sectional view of the ported linear alternator assembly of FIG. 1 with pistons positioned following a compression stroke.

FIG. 15 is a schematic illustration in partial cross-sectional view of the ported linear alternator assembly of FIG. 1 with pistons positioned following a geometrically under-expanded expansion stroke.

FIG. 16 is a schematic illustration in partial cross-sectional view of the ported linear alternator assembly of FIG. 1 with pistons positioned following an exhaust stroke.

FIG. 17 is a schematic illustration in partial cross-sectional view of the ported linear alternator assembly of FIG. 1 with pistons moved to a reset position.

DETAILED DESCRIPTION

Figures 8, 9, 10, 11, 12:
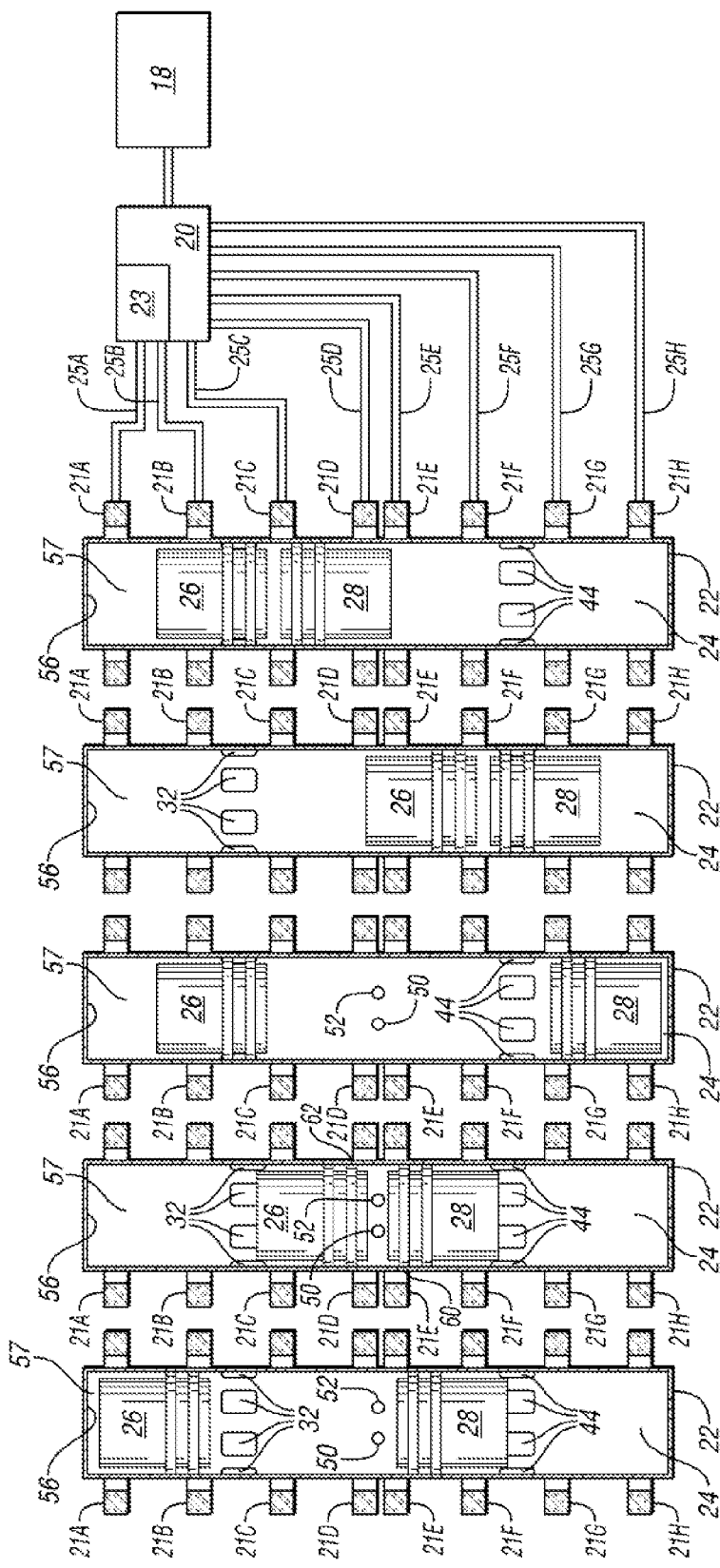
FIG. 8 is a schematic illustration in partial cross-sectional view of the ported linear alternator assembly of FIG. 1 with pistons positioned following a reduced intake stroke of an alternate four-stroke working cycle.
FIG. 9 is a schematic illustration in partial cross-sectional view of the ported linear alternator assembly of FIG. 1 with pistons positioned following a compression stroke.
FIG. 10 is a schematic illustration in partial cross-sectional view of the ported linear alternator assembly of FIG. 1 with pistons positioned following an expansion stroke.
FIG. 11 is a schematic illustration in partial cross-sectional view of the ported linear alternator assembly of FIG. 1 with pistons positioned following an exhaust stroke.
FIG. 12 is a schematic illustration in partial cross-sectional view of the ported linear alternator assembly of FIG. 1 with pistons moved to a reset position.

Referring to the drawings, wherein like reference numbers refer to like components throughout the several views, FIG. 1 shows a powertrain 10 that includes a linear alternator assembly 12 and optionally includes a turbine 14 operatively connected to the linear alternator assembly 12 to turn a shaft 16. The linear alternator assembly 12 is also operatively connected to an electrical device 18 for providing or receiving electrical energy. The linear alternator assembly 12 is controlled by an electronic controller 20 as described herein to provide a variable four-stroke working cycle. Specifically, the controller 20 controls electrical power delivered to coils 21A, 21B, 21C, 21D, 21E, 21F, 21G, and 21H through electrical wire bundles 25A, 25B, 25C, 25D, 25E, 25F, 25G and 25H, respectively. The wire bundles 25A-35H can each have two transfer wires to provide current through the coils. The electrical energy device 18 can be an energy storage device such as a battery that provides electrical energy as needed to the coils. The controller 20 can have an integrated power inverter that converts current supplied from the energy storage device 18 to the coils 21A-21H in the form of pulsed or alternating current. In the embodiments described herein, the electrical device 18 is referred to as an energy storage device 18.

The coils 21A-21H are spaced from one another along a length of the cylinder 24 at specific positions in relation to the inlet ports 32, the exhaust ports 44, and dependent on a length of the pistons 26, 28. The coils 21A-21H are positioned so that, when one or more of the coils is selectively energized by the controller 20 according to an algorithm stored in a processor 23 of the controller 20, the pistons 26, 28 will move according to a selected four-stroke working cycle. At least one of the strokes in the four-stroke working cycle can be varied to adjust the cycle to meet required energy output demands. That is, the pistons 26, 28 can be controlled to move asymmetrically within the cylinder 24, and the intake stroke or the exhaust stroke can be varied. As used herein, the pistons 26, 28 move "asymmetrically" when piston 26 moves a different distance than piston 28 within the cylinder 24 during a stroke. As output power commands change, the four-stroke working cycle may be varied, changing from a cycle with geometrically smaller intake and compression strokes than expansion and exhaust strokes, that is an Atkinson or Miller cycle, described with respect to FIG. 8 to FIG. 12, to a cycle with geometrically similar intake, compression, expansion, and exhaust strokes, that is an Otto or Diesel cycle, described with respect to FIG. 3 to FIG. 7. Additionally, if the output energy is in the form of compressed gas directed to a turbine 14 to turn the shaft 16, then the controller 20 may vary the cycle to provide a cycle with geometrically larger intake and compression strokes than expansion and exhaust strokes, that is an under-expanded expansion stroke, as described with respect to FIGS. 13-17, thereby ensuring that pressure of the compressed gas that is exhausted to the turbine is sufficient to turn the shaft. In fact, the expansion stroke can be controlled so that electrical output power is just sufficient to keep the linear alternator 12 functioning, so that maximum exhaust gas pressure will be preserved to do work at shaft 16 and all of the work output of the powertrain 10 will be available from the shaft.

The linear alternator assembly 12 of FIG. 1 includes a cylinder block 22 that defines a cylinder 24. A first magnetic or magnetizable piston 26 and a second magnetic or magnetizable piston 28 are contained within the cylinder 24. The pistons 26, 28 can be permanently magnetized or can contain material that can be magnetized, such as a ferromagnetic material. The pistons 26, 28 are referred to as "free" pistons because they are not mechanically connected to a piston rod or other component that could affect their movement within the cylinder 24. Instead, the pistons 26, 28 can be moved anywhere within the cylinder 24, subject to the pattern of energization of the coils 21A-21H. The pistons 26, 28 are referred to as "opposing" pistons because the working volume of the cylinder is between the pistons 26, 28. Because the pistons 26 and 28 are magnetic or magnetizable, when any one of the coils 21A-21H is energized, a magnetic field is created that can act upon the pistons 26 or 28 if an energized one of the coils 21A-21H is at least partially directly radially outward of the piston 26 or 28, or the piston 26 or 28 is within a predetermined close vicinity of the energized coil 21A-21H. In FIG. 1, the coils 21A-21H are shown surrounding the cylinder 24. The block 22 may be of sufficient thickness such that the coils 21A-21H are embedded in the block 22.

FIG. 1 shows only one cylinder 24. The block 22 may contain multiple cylinders 24. For example, FIG. 2 shows a block 122 that contains four cylinders 24 arranged to form a square. Because the linear alternator assembly 12 can provide shaft energy without a crankshaft, and without inlet and outlet valves controlling fluid flow into and out of the cylinder 24, multiple cylinders 24 can be arranged in a variety of orientations without the need to connect the pistons to a crankshaft or to have a camshaft overlay any valves. Each cylinder 24 would have a separate set of pistons 26, 28 and a four-stroke working cycle is carried out within each cylinder 24.

The block 22 defines a cylinder wall 30 that has a plurality of inlet ports 32 through which fluid can be provided from a fluid source to the cylinder 24. In one embodiment, the fluid can be air. In FIG. 1, fluid is shown directed through a passage 34 to the inlet ports 32. Fluid is provided from a fluid source through a fluid inlet 36 as shown by arrow A, and is directed to a compressor 38, then through a passage 40 to a heat exchanger 42 as indicated by arrow B, and on to the passage 34 to the inlets 32, as indicated by arrow C. The heat exchanger 42 can be an intercooler to improve charge density of the fluid.

The cylinder wall 30 also has a plurality of exhaust ports 44, shown blocked by the second piston 28 in FIG. 1. When the exhaust ports 44 are unblocked, fluid can flow through a passage 46 as indicated by arrows D to the turbine 14. Depending on the four-stroke working cycle occurring in the cylinder 24, the fluid can be at least partially compressed when it leaves the exhaust ports 44, so that it expands in the turbine 14, causing the turbine 14 to turn the shaft 16, producing shaft work. A heat exchanger 47 can be provided so that heat can be extracted from the fluid that is exhausted from the turbine 14 in the direction of arrow E before the fluid is finally exhausted through exhaust pipe 49 in the direction of arrow F directly to atmosphere or to an exhaust system, if needed. The heat exchangers 42 and 47 may be combined to form a recuperator of a regenerator to improve thermal efficiency of the powertrain 10 if the pressure ratios from A to B and from D to E are sufficient. If the ported linear alternator assembly 12 and powertrain 10 are included on an automotive vehicle, a conventional exhaust treatment system may be used, which may include such items as a catalytic converter (not shown) or an exhaust gas recirculation path (not shown), in an effort to reduce the amount of certain predetermined compounds in any exhaust exiting through exhaust pipe 49.

Alternatively, the controller 20 can control the pistons 26, 28 so that the exhausted fluid does not retain significant compression, instead utilizing the movement of the pistons 26, 28 to create electrical energy that can be delivered to the electrical energy device 18. That is, the controller 20 can have electrical switches set to cause electric current to flow from selected ones of the coils 21A-21H to the energy storage device 18 when the pistons 26, 28 pass the respective ones of the coils 21A-21H during the expansion stroke of the cycle.

The cylinder 24 has a generally centrally located fuel port 50, positioned between the inlet ports 32 and the exhaust ports ports 44. The fuel port 50 is in fluid communication with a fuel source, such as fuel source 61 of FIG. 18, and a fuel injector that can be selectively controlled to inject fuel into the cylinder 24. An optional spark port 52 is also centrally located between the inlet ports 32 and the exhaust ports 44. The spark port 52 is provided if the pistons 26, 28 are to be optionally controllable according to a four-stroke working cycle that uses a type of fuel requiring spark ignition. For example, the spark port 52 is provided if the fuel is gasoline, and the controller 20 can control the pistons 26, 28 according to an Otto cycle or an alternative spark ignition four-stroke working cycle. If the fuel is diesel fuel, a spark port 52 need not be provided, and the four-stroke working cycle can be a Diesel cycle or an alternative compression ignition cycle.

FIGS. 3-6 show the pistons being controlled to move according to a four-stroke working cycle that is an Otto cycle in the case of spark-ignited fuels or a Diesel cycle in the case of compression ignition fuels. The controller 20 and energy storage device 18 are shown only in FIG. 7, but are operatively connected to the coils 21A-21H in the portions of the cycle illustrated in FIGS. 3-6 as well. FIG. 3 shows pistons 26, 28 positioned at the end of an intake stroke, FIG. 4 shows pistons 26, 28 positioned at the end of a compression stroke, FIG. 5 shows the pistons 26, 28 positioned at the end of an expansion stroke, and FIG. 6 shows pistons 26, 28 positioned at the end of an exhaust stroke. FIG. 7 shows the pistons 26, 28 controlled to move to a reset position prior to repeating the four-stroke working cycle of FIGS. 3-6. FIG. 7 shows the pistons 26, 28 positioned in reset positions following a fifth stroke in which the pistons 26, 28 move from the exhaust positions of FIG. 6 to reset positions. The piston motion between the position of FIG. 6 and the position of FIG. 7 is not part of the working cycle. That is, all of the work of the fluid is done via the intake, compression, expansion, and exhaust strokes of FIGS. 3-6. As used herein, an "Otto" cycle is a cycle in which the intake stroke is configured to be symmetrical with the expansion stroke. That is, the pistons 26, 28 are controlled to be spaced apart in FIG. 3, at the end of the intake stroke and in FIG. 5, at the end of the expansion stroke, so that the difference in volume between the cylinders 26, 28 at the end of the intake stroke of FIG. 3 as compared to the compression stroke of FIG. 4 is substantially equal to the difference in volume between the cylinders at the end of the expansion stroke of FIG. 5 as compared to the compression stroke of FIG. 4. A "Diesel" cycle is a cycle having the same four-stroke working cycle as the Otto cycle, but with expansion being a result of compression ignition of a fuel, and, theoretically, constant pressure combustion of the fuel as it is being injected and is mixing with the air in the cylinder, rather than spark ignition of a fuel, and, theoretically, constant volume combustion of a fuel that has already mixed with the air in the cylinder.

In the four-stroke working cycle illustrated in FIGS. 3-6, the cylinders 26, 28 begin in the starting positions of FIG. 7, with the inlet ports 32 blocked by piston 26. The pistons 26, 28 are placed in the starting positions of FIG. 7 by energizing the coils 21B, 21C and 21D. The pistons 26, 28 are then moved according to an intake stroke by the magnetic field established as a result of the current provided to coils 21A, 21B, 21E, and 21F. The magnetic field establishes forces that bias the piston 26 outward to a position between the inlet ports 32 and a first end wall 56 of the cylinder 24 to unblock the inlet ports 32. The magnetic field established by the current provided to coil 21G biases the piston 28 outward in the opposite direction to a position approximately half way between the fuel port 50 and a second end wall 58 opposite the first end wall 56 to completely cover the exhaust ports 44. The exhaust ports 44 are further from the fuel port 50 than a sealing ring 60 of the piston 28 so that no working fluid that is provided to the portion of the cylinder 24 between the pistons 26, 28 can vent through the exhaust ports 44 during the inlet stroke.

After working fluid is provided through the inlet ports 32 during the intake stroke of FIG. 3, the controller 20 controls electrical power flow to the coils so that only coils 21C, 21D, 21E and 21F are energized and the pistons 26, 28 therefore move from the positions in FIG. 3 to the positions in FIG. 4 creating a compression stroke. The current provided to the coils 21C, 21D creates a magnetic field that moves the piston 26 toward the center of the cylinder 24 so that a sealing ring 62 of the piston 26 is between the inlet ports 32 and the fuel port 50. Electrical power is provided to the coils 21E, 21F to create a magnetic field so that the piston 28 is moved toward the center of the cylinder 24, with the sealing ring 60 between the exhaust ports 44 and the fuel port 50. At the end of the compression stroke, the pistons 26, 28 are in the positions shown in FIG. 4, and both the inlet ports 32 and the exhaust ports 44 are blocked from the working volume between the pistons 26, 28.

Fuel is injected into the working volume using a fuel injector connected at the port 50. If the fuel is diesel fuel, then the fuel is injected primarily at the end of the compression stroke. If the fuel is gasoline rather than diesel fuel, then the fuel is injected at the end of the intake stroke, and a spark is generated by a spark plug at the spark port 52 at the end of the compression stroke. The fuel-fluid mixture combusts at the end of the compression stroke, driving the pistons 26, 28 outward toward the respective end walls 56, 58, and the energization of the coils is simultaneously changed from biasing the pistons 26, 28 in the direction of travel, using electrical energy from the storage device 18, to biasing the pistons against the direction of travel during the expansion stroke, generating electrical energy for the storage device 18, so that coils 21C, 21D, 21E and 21F are still energized at the start of the expansion stroke. The pistons 26, 28 thus move according to an expansion stroke from the positions in FIG. 4 to the positions in FIG. 5, in which the inlet ports 32 are blocked by piston 26 and the exhaust ports 44 are unblocked. A comparison of FIGS. 3 and 5 illustrates that the volume between the pistons 26, 28 at the end of the intake stroke of FIG. 3 is substantially equal to the volume between the pistons 26, 28 at the end of the expansion stroke of FIG. 5.

Following the expansion stroke, the controller 20 switches the energized coils to only coils 21E, 21F, and 21G to move the pistons 26, 28 to the positions shown in FIG. 6 in an exhaust stroke. The piston 26 moves towards piston 28 immediately adjacent the exhaust ports 44, and piston 28 moves toward piston 26, forcing the fluid out of the exhaust ports 44 and stopping at a position in which the piston 28 blocks the exhaust ports 44. The pistons 26, 28 are then moved to the reset positions of FIG. 7 when the four-stroke working cycle is complete. Only coils 21B, 21C, and 21D are energized to move the pistons 26, 28 to the position of FIG. 7 in which the inlet ports 32 are blocked by piston 26. Additional uncombusted working fluid can then be provided to the cylinder 24 and the cycle repeated, beginning with movement of the cylinders 26, 28 to the positions shown in FIG. 3 as an inlet stroke.

In one embodiment, the piston 26 or the cylinder 24 may be configured so that some of the combusted fluid escapes past the piston 26 into the terminal portion 57 of the cylinder 24 between the piston 26 and the end wall 56, indicated in FIG. 5. For example, a linear slot could be formed in the piston 26, or the block 22 could be formed with a passage or recess extending around the piston 26 from near the center of the cylinder 24 to the terminal portion 57. Trapped gas in the terminal portion 57 will provide a cushion with a spring-back effect, urging the piston 26 to move toward the exhaust position of FIG. 6 at the end of the expansion stroke of FIG. 5, thus decreasing the electrical power required to the coils 21E, 21F to move the piston 26. The terminal portion 57 may be referred to as a "bounce space" of trapped gas outward of the piston 26 (i.e. on the non-firing reverse side of the piston 26), to reduce the amount of force that must be produced magnetically to move the piston 26. A similar terminal portion or bounce space may be provided outward of the piston 28, between the piston 28 and the end wall 58.

The four-stroke working cycle of FIGS. 3-6 is very efficient because frictional losses are minimized without a crankshaft or a valve train. Moreover, because balanced combustion is achievable, any exhaust treatment can be according to conventional vehicle exhaust treatment methods. That is, an intake stroke during which the exhaust ports 44 can be covered and an exhaust stroke during which the intake ports 32 can be covered allow the amount of mixing of air into the exhaust to be limited and controlled, so that in the case of spark ignition a conventional catalytic converter can operate very effectively. Furthermore, the pressure of the exhaust gas may be substantially above the pressure of the intake air, which allows a greater amount of useful work to be produced by an exhaust turbine.

The linear alternator assembly 12 is also immediately adaptable to changes in desired output to balance the power afforded by an Otto or Diesel cycle of FIGS. 3-6 with fuel efficiency of an Atkinson or Miller cycle shown in FIGS. 8-12. That is, the linear alternator 12 is controllable according to a variable four-stroke working cycle. In FIG. 8, the intake stroke of the cycle is shortened or reduced, as is evident in comparison to the positions of the pistons 26, 28 at the end of the intake stroke of FIG. 3. That is, instead of energizing coils 21A, 21B, and 21G as in the Otto or Diesel cycle of FIG. 4, only coils 21A, 21B, and 21F are energized. The piston 28 therefore moves closer to the center of the cylinder 24 in the intake stroke of FIG. 8. The controller 20 energizes the coils 21A-21F according to the same patterns described with respect to FIGS. 4-7 in the compression, expansion, and exhaust strokes of FIGS. 9-11, as well as in the reset stroke of FIG. 12. The four-stroke working cycle of FIGS. 8-11 differs from the four-stroke working cycle of FIGS. 3-6 in that the intake stroke of FIG. 8 is shortened. The compression ratio is kept constant in the working cycle of FIGS. 8-11 compared to the working cycle of FIGS. 3-6, as the pistons 26, 28 are closer together at the end of the compression stroke in FIG. 9 than in FIG. 4. This results in a greater expansion ratio (i.e., the volume between the cylinders 26, 28 at the end of the expansion stroke (FIG. 10) divided by the volume between the cylinders 26, 28 at the beginning of the expansion stroke (FIG. 9), as moving the pistons 26, 28 from the positions of FIG. 9 to the positions of FIG. 10, results in a greater change in the volume between the pistons 26, 28 than when the pistons 26, 28 are moved from the positions in FIG. 4 to the positions in FIG. 5. FIG. 10 shows a greater volume between the pistons 26, 28 than exists in FIG. 8. The increased expansion ratio is associated with greater fuel economy, but provides less power than in the Otto or Diesel cycle of FIGS. 3-7, because the amount of air and fuel used is reduced by the shorter intake stroke, and less power output from the shaft 16 because the pressure of the working fluid delivered to the turbine 14 is reduced. For example, if the linear alternator 12 is installed on a powertrain 10 with a turbine 14, and operating conditions provided via various sensors to the controller 20 indicate that less torque is required at the shaft 16, then the controller 20 may vary the four-stroke working cycle of the alternator 12 from the cycle of FIGS. 3-7 to the cycle of FIGS. 8-11. Alternately, the controller 20 could continue operating according to the cycle of FIGS. 3-7, but control the coils 21A-21H so that some of the work of the pistons 26, 28 is converted to electrical energy that is stored in to the electrical storage device 18.

Moreover, if the linear alternator assembly 12 is operatively connected to a turbine 14 as indicated in FIG. 1, then some of the pressurization of the fluid can be retained after the expansion stroke by controlling the expansion stroke to be shortened relative to the intake stroke. This may be referred to as a four-stroke working cycle having a geometrically under-expanded expansion stroke. This four-stroke working cycle is illustrated in FIGS. 13-16, with the reset position of the pistons 26, 28 illustrated in FIG. 17. The four-stroke working cycle of FIGS. 13-16 is asymmetric as the intake stroke (i.e., the movement of the pistons 26, 28 from the positions of FIG. 17 to the positions of FIG. 13) is longer than the expansion stroke (i.e., the movement of the pistons 26, 28 from the positions of FIG. 14 to the positions of FIG. 15), with the piston 26 controlled to be positioned closer to the center of the cylinder 24 at the end of the expansion stroke, as shown in FIG. 15, than in the Otto or Diesel cycle of FIG. 5 or the Atkinson or Miller cycle of FIG. 10. To achieve the shortened expansion stroke, the controller 20 energizes coils 21C, 21D, 21E and 21F but uses the coils 21C and 21D to maintain the position of the piston 26 rather than to generate electrical power. With the shorter expansion stroke, the working fluid expelled through the exhaust ports 44 in the exhaust stroke from FIG. 15 to FIG. 16 can then be directed to the turbine 14 with at least some energy remaining to expand at the turbine 14 to turn the shaft 16. The alternative under-expanded four-stroke working cycle is created by shortening the expansion stroke, to provide only enough power to keep the piston-cylinder arrangement functioning with little or no net output power and to deliver high-pressure exhaust gas for expansion in the turbine 14 to produce shaft work. The linear alternator assembly 12 may thus be operated as a pure linear alternator, producing electrical power only, or as a gas-generating linear alternator, producing hot, high-pressure gas for expansion in a shaft turbine 14 or other output device.

Figure 18:
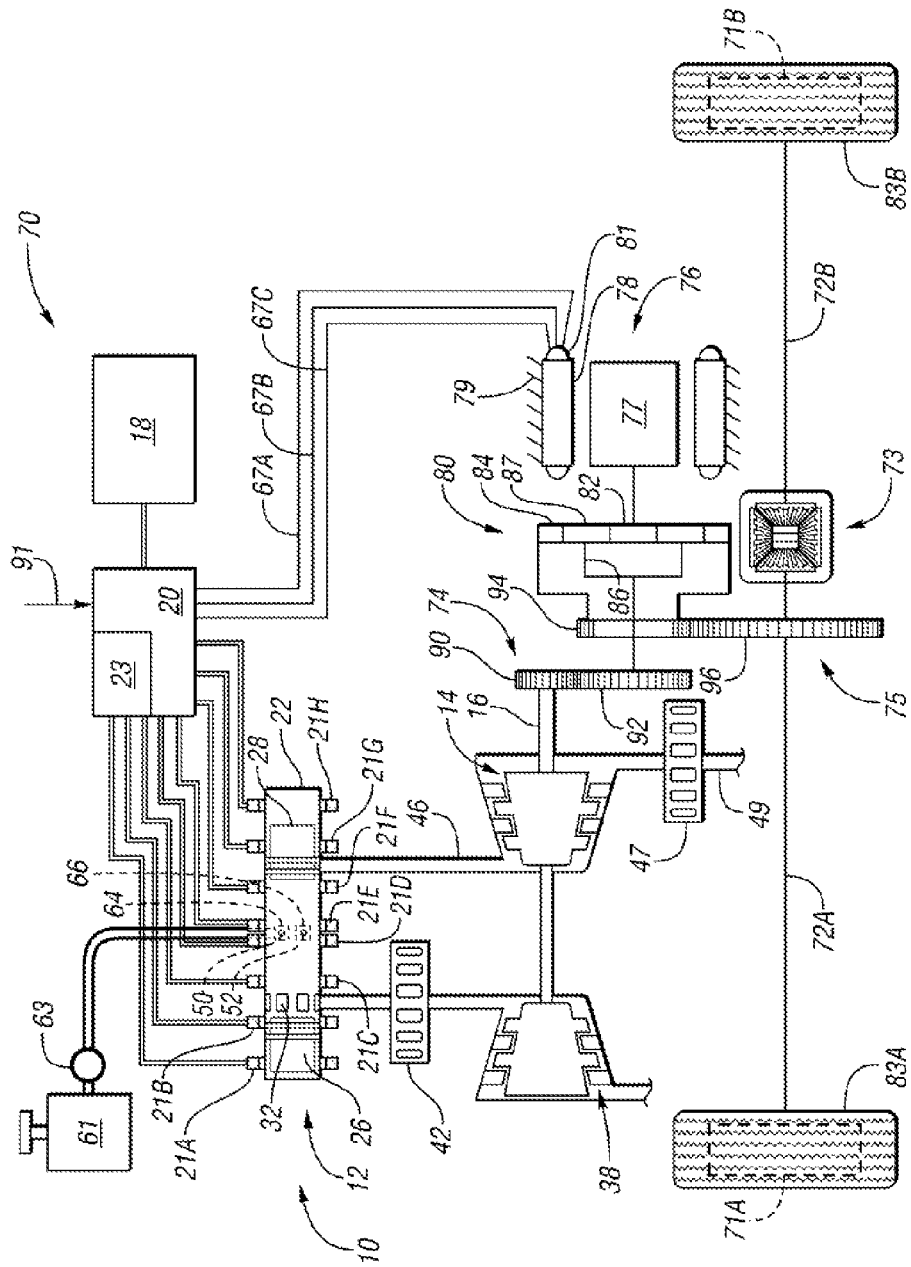
FIG. 18 is a schematic illustration in partial cross-sectional view of a vehicle with the ported linear alternator assembly of FIG. 1.

FIG. 18 shows one application of the linear alternator assembly 12 as a prime mover in a powertrain 10 of a vehicle 70. A fuel supply 61 supplies fuel via a fuel pump 63 to a fuel injector 64 at the fuel port 50. A spark plug 66 is mounted at the spark port 52. The powertrain 10 with linear alternator assembly 12 described in FIG. 1 is expanded to include drive axles 72A, 72B supporting wheels 71A, 71B, driven through a first gear train 74, a planetary gear set 80, and a second gear train 75 by the linear alternator assembly 12 via an electric motor/generator 76 and by the turbine 14 via the shaft 16. The vehicle 70 is a hybrid electric vehicle, as the electric motor/generator 76 is used as a second power source. The motor/generator 76 is connected to the gear train 74 through a planetary gear set 80 to drive the drive axles 72A, 72B. The drive axles 72A, 72B generally rotate at the same speed, but a differential 73 allows for speed differentials between the axles 72A, 72B due to slip of one of the wheels 71A, 71B. The wheels 71A, 71B each support a respective tire 83A, 83B.

The planetary gear set 80 has a sun gear member 82, referred to as a first member, a carrier member 86, referred to as a second member, and a ring gear member 84, referred to as a third member. Pinion gears 87 are rotatably supported by the carrier member 86 and mesh with both the sun gear member 82 and the ring gear member 84.

The electric motor/generator 76 has a rotatable rotor 77 and a stationary stator 78 grounded to a stationary member 79 such as a motor housing. Stator windings 81 are operatively connected to the controller 20 by electrical cables 67A, 67B, 67C, and receive electric current under control of the controller 20 using electrical energy stored in the energy storage device 18. Alternately, the motor/generator 76 can be controlled by the controller 20 to function as a generator, in which case the stator 79 provides electric current to the energy storage device 18 under the control of the controller 20. The controller 20 may include an integrated power inverter to convert direct current supplied by the energy storage device to alternating current required to power the stator 79, and to convert alternating current supplied from the stator to direct current to be converted to and stored as electrical energy in the storage device 18.

The gear train 74 includes a first gear 90 connected for rotation with the shaft 16, a second gear 92 meshing with the first gear 90 and connected to rotate commonly with the carrier 86 (i.e., to rotate at the same speed as the carrier 86). The gear train 75 has a first gear 94 connected to rotate with the ring gear member 84 and meshing with a second gear 96 connected to rotate with the drive axles 72A, 72B. Gear 94 is a sleeve-type, annular gear, allowing a shaft connecting gear 92 to carrier 86 to pass through the gear 94. The shaft 16 driven by the turbine 14, and ultimately by the four-stroke working cycle in the cylinder 24 of the linear alternator assembly 10, is operatively connected to the carrier member 86. The drive axles 72A, 72B are operatively connected to the ring gear member 84 through the gear train 75. The motor/generator 76 and the linear alternator assembly 12 thus are operable to provide a variable speed drive at the vehicle drive axles 72A, 72B through the planetary gear set 80.

The controller 18 can receive input signals 91 indicative of vehicle operating conditions, including commanded torque at the drive axles 72A, 72B, such as may be provided by a vehicle accelerator pedal position sensor. Based on the input signals 91, the controller 20 can vary the four-stroke working cycle of the linear alternator assembly 12, producing more or less shaft work at shaft 16. The controller 20 can also control operation of the motor/generator 76 to provide balancing torque as needed by operating the motor/generator 76 as a motor or generator, while the controller 20 combines the electrical power to or from the linear alternator 12, the motor/generator 76, and the energy storage device 18 in a combination that efficiently produces the commanded torque at the drive axles 72A, 72B. The motor/generator 76 can also be controlled to vary the speed ratio from the shaft 16 to the drive axles 72A, 72B, as necessary through the planetary gear set 80 and the gear train 75. This allows the linear alternator assembly 12 to be controlled to operate according to a fuel efficient, four-stroke working cycle, such as the Atkinson or Miller cycle, with additional torque requirements provided as needed by the motor/generator 76. The motor/generator 76 may also be controlled to operate as a generator to capture regenerative braking energy by converting torque at the drive axles 72A, 72B into stored electric energy in the energy storage device 18. The use of the linear alternator assembly 12 in the hybrid electric vehicle 10 thus enables flexible and efficient delivery of required output torque, with low emissions, and efficient combustion.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A linear alternator assembly comprising:
   a cylinder block defining a cylinder, the cylinder having:
      inlet ports at which fluid enters the cylinder;
      exhaust ports at which fluid is exhausted from the cylinder; and
      a fuel port through which fuel is selectively supplied to the cylinder for combustion;
   a plurality of energizable coils surrounding the cylinder;
   a first and a second piston contained within the cylinder and defining a working volume in the cylinder between the first piston and the second piston; wherein the first and the second piston are magnetic or magnetizable;
   an electronic controller operatively connected to the coils and configured to selectively energize different ones of the coils to thereby move the first and the second pistons asymmetrically within the cylinder to change the working volume, energization of said different ones of the coils and combustion of the fuel establishing a four-stroke working cycle producing at least one of compressed gas and electrical energy;
   wherein the first piston and the second piston are movable independently of one another by said energization; and
   wherein only the inlet ports are selectively opened and closed by movement of the first piston and only the exhaust ports are selectively opened and closed by movement of the second piston, movement of the pistons thus controlling fluid flow in the working chamber, and the inlet ports and the exhaust ports thus being free from valves.

2. The linear alternator assembly of claim 1, wherein the four-stroke working cycle is an Otto cycle.

3. The linear alternator assembly of claim 1, wherein the four-stroke working cycle is an Atkinson cycle.

4. The linear alternator assembly of claim 1, wherein the controller is configured to vary at least one stroke of the four-stroke working cycle in response to a change in a required output of said at least one of compressed gas and electrical energy.

5. The linear alternator assembly of claim 1, wherein the four-stroke working cycle includes an expansion stroke; and wherein the coils are selectively energized such that the expansion stroke is geometrically under-expanded.

6. The linear alternator assembly of claim 5, in combination with a turbine and a shaft operatively connected to the turbine; wherein the four-stroke working cycle produces compressed gas; wherein the four-stroke working cycle includes an exhaust stroke; and wherein the exhaust ports are in fluid communication with the turbine to provide the compressed gas to the turbine during the exhaust stroke.

7. The linear alternator assembly of claim 6, in further combination with a compressor operatively connected to the shaft and to the inlet ports.

8. The linear alternator assembly of claim 7, further comprising:
   at least one heat exchanger positioned in fluid communication with the cylinder.

9. The linear alternator assembly of claim 1, wherein the cylinder block defines an end wall of the cylinder that partially defines a terminal portion of the cylinder between the end wall and one of the pistons; wherein the terminal portion is configured to trap gas provided from the combustion chamber to provide a return force when combustion forces move said one of the pistons toward the terminal portion.

10. The linear alternator assembly of claim 1, wherein the cylinder is a first cylinder; wherein the cylinder block defines three additional cylinders symmetrically positioned with respect to the first cylinder in a square orientation.

11. The linear alternator assembly of claim 1, further comprising:
   at least one electrical device operatively connected to the coils; and
   wherein the coils are controlled so that electrical energy is output from the coils to said at least one electrical device due to movement of the first and the second pistons.

12. The linear alternator assembly of claim 11, wherein said at least one electrical device is an energy storage device operable to store the electrical energy.

13. The linear alternator assembly of claim 1, wherein the cylinder, the first piston, the second piston, the inlet ports, and the outlet ports are configured so that the first piston and the second piston block the inlet ports and the outlet ports from the working chamber without blocking the inlet ports or the outlet ports from a remainder of the cylinder outward of the first and the second pistons to the end walls when in a compression stroke of the four-stroke working cycle.

14. A vehicle comprising:
   a linear alternator assembly having:
      a cylinder block defining a cylinder and end walls of the cylinder, the cylinder having:
         inlet ports at which fluid enters the cylinder;
         exhaust ports at which fluid is exhausted from the cylinder; and a fuel port through which fuel is selectively supplied to the cylinder for combustion;

a plurality of energizable coils surrounding the cylinder;

a first and a second piston contained within the cylinder and defining a working volume in the cylinder between the first piston and the second piston; wherein the first and the second piston are magnetic or magnetizable;

an electronic controller operatively connected to the coils and configured to selectively energize different ones of the coils to thereby move the first and the second pistons asymmetrically within the cylinder to change the working volume, energization of said different ones of the coils and combustion of the fuel establishing a four-stroke working cycle producing compressed gas;

wherein the first piston and the second piston are movable independently of one another by said energization; and wherein only the inlet ports are selectively opened and closed by movement of the first piston and only the exhaust ports are selectively opened and closed by movement of the second piston, movement of the pistons thus controlling fluid flow in the working chamber, and the inlet ports and the exhaust ports thus being free from valves; wherein the cylinder, the first piston, the second piston, the inlet ports, and the outlet ports are configured so that the first piston and the second piston block the inlet ports and the outlet ports from the working chamber without blocking the inlet ports or the outlet ports from a remainder of the cylinder outward of the first and the second pistons to the end walls when in a compression stroke of the four-stroke working cycle;

a turbine operatively connected to the exhaust ports and driven by expansion of the compressed gas expelled through the exhaust ports during the four-stroke working cycle;

a shaft driven by the turbine; and a vehicle drive axle operatively connected with and at least partially driven by the shaft.

15. The vehicle of claim 14, further comprising:

at least one vehicle electrical device operatively connected to the coils; and wherein the coils are controlled so that electrical power is output from the coils to said at least one vehicle electrical device during the four-stroke working cycle.

16. The vehicle of claim 15, wherein said at least one vehicle electrical device is an energy storage device, and further comprising:

an electric motor/generator operatively connected to the controller, to the energy storage device, and to the vehicle drive axle; and wherein the electric motor/generator is operable to provide torque at the drive axle when the four-stroke working cycle is an Atkinson cycle.

17. The vehicle of claim 14, further comprising:

a planetary gear set having a first member, a second member, and a third member;

an electric motor/generator operatively connected to the first member of the planetary gear set and to the electronic controller;

wherein the shaft driven by the turbine is operatively connected to a second member of the planetary gear set;

an energy storage device operatively connected to the plurality of energizable coils and to the electric motor/generator; and wherein the vehicle drive axle is operatively connected to the third member of the planetary gear set; the electric motor/generator and the linear alternator assembly thus being operable to provide a variable speed drive at the vehicle drive axle through the planetary gear set.

18. The vehicle of claim 14, wherein the controller is configured to vary at least one stroke of the four-stroke working cycle in response to a change in required torque at the drive axle.

* * * * *